United States Patent
Le et al.

(10) Patent No.: US 9,519,479 B2
(45) Date of Patent: Dec. 13, 2016

(54) TECHNIQUES FOR INCREASING VECTOR PROCESSING UTILIZATION AND EFFICIENCY THROUGH VECTOR LANE PREDICATION PREDICTION

(71) Applicant: GLOBALFOUNDRIES INC., Grand Cayman (KY)

(72) Inventors: Hung Q. Le, Austin, TX (US); Jose E. Moreira, Irvington, NY (US); Pratap C. Pattnaik, Ossining, NY (US); Brian W. Thompto, Austin, TX (US); Jessica H. Tseng, Fremont, CA (US)

(73) Assignee: GLOBALFOUNDRIES INC., Grand Cayman (KY)

(*) Notice: Subject to any disclaimer, the term of this patent is extended or adjusted under 35 U.S.C. 154(b) by 372 days.

(21) Appl. No.: 14/082,652

(22) Filed: Nov. 18, 2013

(65) Prior Publication Data

US 2015/0143083 A1  May 21, 2015

(51) Int. Cl.
*G06F 9/30* (2006.01)
*G06F 9/38* (2006.01)

(52) U.S. Cl.
CPC ....... *G06F 9/30018* (2013.01); *G06F 9/30036* (2013.01); *G06F 9/3832* (2013.01); *G06F 9/3887* (2013.01); *G06F 9/30072* (2013.01)

(58) Field of Classification Search
CPC  G06F 9/30018; G06F 9/30072; G06F 9/3887; G06F 9/3832; G06F 9/30036
See application file for complete search history.

(56) References Cited

U.S. PATENT DOCUMENTS

| | | | |
|---|---|---|---|
| 6,513,109 B1 * | 1/2003 | Gschwind | G06F 9/30072 712/200 |
| 8,271,832 B2 | 9/2012 | Gonion et al. | |
| 8,356,162 B2 | 1/2013 | Muff et al. | |

(Continued)

FOREIGN PATENT DOCUMENTS

| WO | WO2006057685 A1 | 6/2006 |
|---|---|---|
| WO | WO2012064677 A1 | 5/2012 |

OTHER PUBLICATIONS

IBM, "Vector Compare with Mask for Small Vector SIMD," An IP.com Prior Art Database Technical Disclosure, IPCOM000186051D, Aug. 6, 2009.

(Continued)

*Primary Examiner* — Aimee Li
*Assistant Examiner* — Courtney Carmichael-Moody
(74) *Attorney, Agent, or Firm* — Michael LeStrange; Andrew M. Calderon; Roberts Mlotkowski Safran Cole & Calderon P.C.

(57) ABSTRACT

Techniques for increasing vector processing utilization and efficiency through use of unmasked lanes of predicated vector instructions for executing non-conflicting instructions are provided. In one aspect, a method of vector lane predication for a processor is provided which includes the steps of: fetching predicated vector instructions from a memory; decoding the predicated vector instructions; determining if a mask value of the predicated vector instructions is available and, if the mask value of the predicated vector instructions is not available, predicting the mask value of the predicated vector instructions; and dispatching the predicated vector instructions to only masked vector lanes.

12 Claims, 5 Drawing Sheets

(56) References Cited

U.S. PATENT DOCUMENTS

| | | | | |
|---|---|---|---|---|
| 2001/0032308 A1* | 10/2001 | Grochowski | ....... | G06F 9/30072 |
| | | | | 712/226 |
| 2003/0110366 A1* | 6/2003 | Wu | ......................... | G06F 9/383 |
| | | | | 712/225 |
| 2014/0115301 A1* | 4/2014 | Sanghai | .............. | G06F 9/30072 |
| | | | | 712/220 |
| 2014/0164737 A1* | 6/2014 | Collange | ............. | G06F 9/30072 |
| | | | | 712/205 |

OTHER PUBLICATIONS

SPI DST, Gajski, Daniel D., "An Algorithm for Solving Linear Recurrence Systems on Parallel and Pipelined Machines," An IP.com Prior Art Database Technical Disclosure, IPCOM000151436D Apr. 22, 2007.

Yeh et al., "Alternative Implementations of Two-Level Adaptive Branch Prediction," The 19th Annual International Symposium on Computer Architecture, pp. 124-134, May 19-21, 1992, Gold Coast, Australia.

\* cited by examiner

TECHNIQUES FOR INCREASING VECTOR PROCESSING UTILIZATION AND EFFICIENCY THROUGH VECTOR LANE PREDICATION PREDICTION

FIELD OF THE INVENTION

The present invention relates to vector processing, and more particularly, to techniques for increasing vector processing utilization and efficiency through use of unmasked lanes for executing non-conflicting instructions.

BACKGROUND OF THE INVENTION

Vector machines permit processing of multiple lanes of data in parallel. Throughput of the processor can be increased by increasing the number of lanes. Accordingly, there are oftentimes vector lanes that are inactive due to predication. Inactive vector lanes are also referred to herein as unmasked lanes. Active vector lanes are also referred to herein as masked lanes.

However, with current vector computing processes, a predicated vector instruction is dispatched and issued to all lanes (for a given cycle) regardless of whether the lane is masked or unmasked. Issuing the same vector instructions without consideration as to whether a given lane is active or inactive is inefficient in terms of processing throughput. Namely, utilization of the unmasked lanes in the processing pipeline is essentially foregone.

Therefore, techniques which increase the pipeline utilization and efficiency would be desirable.

SUMMARY OF THE INVENTION

The present invention provides techniques for increasing vector processing utilization and efficiency through use of unmasked lanes of predicated vector instructions to execute non-conflicting instructions. In one aspect of the invention, a method of vector lane predication for a processor is provided. The method includes the steps of: fetching predicated vector instructions from a memory; decoding the predicated vector instructions; determining if a mask value of the predicated vector instructions is available and, if the mask value of the predicated vector instructions is not available, predicting the mask value of the predicated vector instructions; and dispatching the predicated vector instructions to only masked vector lanes.

In another aspect of the invention, another method of vector lane predication for a processor is provided. The method includes the steps of: fetching predicated vector instructions from a memory; decoding the predicated vector instructions; determining if a mask value of the predicated vector instructions is available and, if the mask value of the predicated vector instructions is not available, predicting the mask value of the predicated vector instructions; when the mask value of the predicated vector instructions is predicted, determining whether the mask value of the predicated vector instructions that is predicted is correct (prior to issuing the instructions) and, if the mask value of the predicated vector instructions that is predicted is incorrect, removing the predicated vector instructions for which the mask value that is predicted is incorrect, and resuming the method at the fetching step; dispatching the predicated vector instructions to only masked vector lanes; issuing the predicated vector instructions to functional units of the processor; executing the predicated vector instructions with the functional units of the processor; and writing back data resulting from executing the predicated vector instructions for all vector lanes to a register file.

A more complete understanding of the present invention, as well as further features and advantages of the present invention, will be obtained by reference to the following detailed description and drawings.

DETAILED DESCRIPTION OF PREFERRED EMBODIMENTS

As provided above, the efficiency of conventional vector processing techniques suffers due to an underutilization of (potentially available) vector lanes. Namely, as provided above, with conventional scenarios the same instruction is typically issued to all vector lanes regardless of whether the lane is masked (active) or unmasked (inactive). This is inefficient and is the result of not being able to dispatch different instructions to different lanes.

The present techniques address this problem by leveraging emerging vector processing architecture which gives one the opportunity to allow different operations to be performed at the different vector lanes at the same cycle. The notion here is that pipeline efficiency can be increased if speculation is done on the not yet available vector lane mask value at the dispatch time to allow dispatching and execution of non-conflicting instructions at unmasked lanes. Thus instead of leaving inactive lanes, these lanes can be utilized (by way of the present techniques) to process other instructions, and thereby pipeline utilization and efficiency can be increased.

Figure 1:
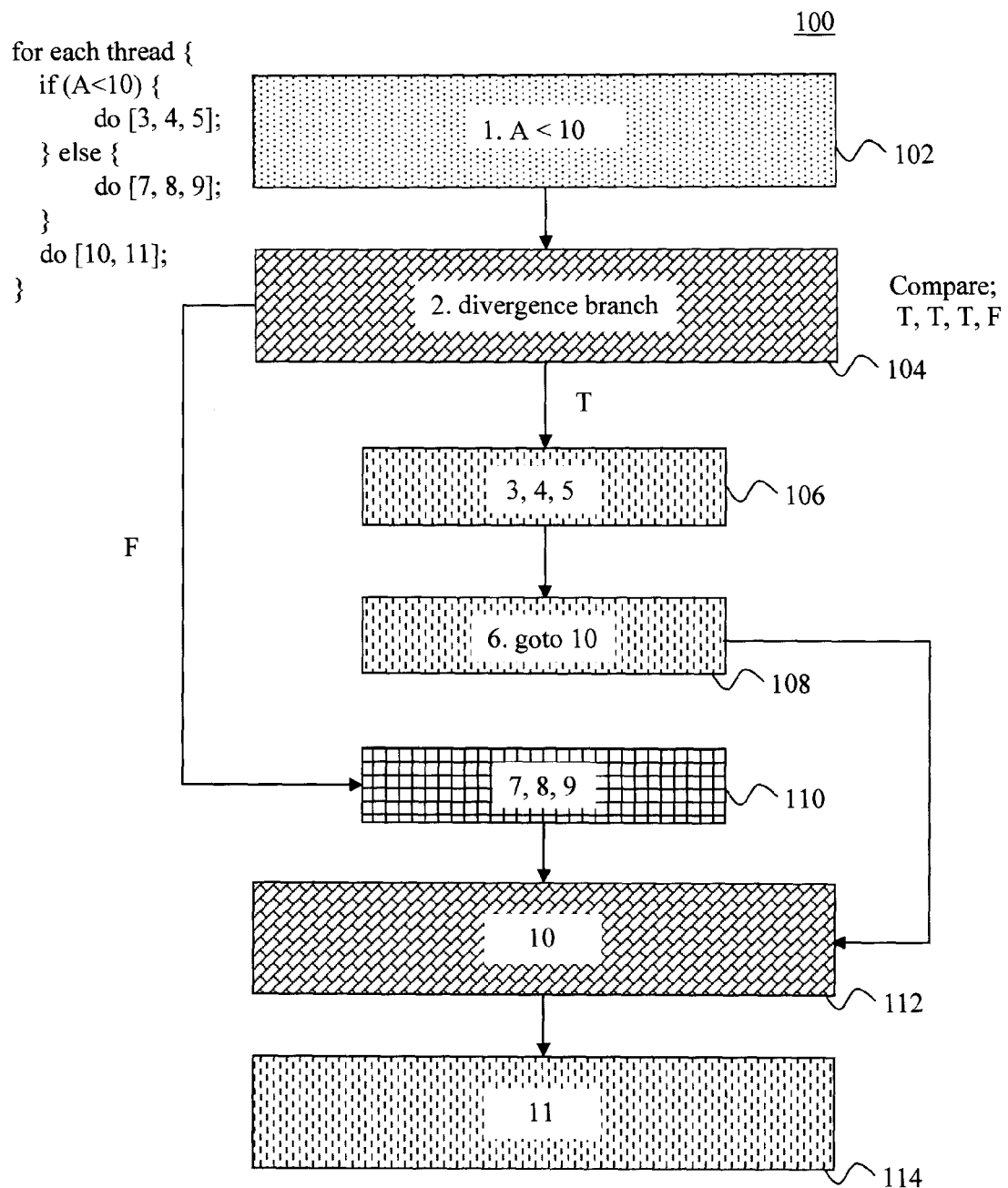
FIG. 1 is a control flow graph of an exemplary code segment according to an embodiment of the present invention.

FIG. 1 is a control flow graph 100 of an exemplary code segment which generally illustrates the present techniques. The example shown in FIG. 1 is that of an if/else single instruction multiple thread (SIMT) control flow divergence example with 4 vector lanes (also referred to herein as "execution lanes"). For clarity, FIG. 2 (a timing diagram) is provided which schematically illustrates control flow graph 100 and provides, for comparison, a baseline flow to illustrate the benefits of the present "ideal" configuration. These figures will be described in conjunction with one another, and for clarity, like elements in the figures are assigned the same pattern.

By way of example only, in this scenario there are four datasets divided over four execution lanes. The predicated vector instructions issued to the lanes are numbered in the figures as 1, 2, 3, etc. It is notable that the number of pipeline stages depends on the particular processor design, and thus what is described here is merely one possible exemplary configuration.

In block 102 of control flow graph 100, variable A is evaluated across all vector lanes. By way of example only, the predicated vector instructions used in this case are if A<10 then do 3, 4, 5, otherwise do 7, 8, 9.

In block 104, depending on the comparison results of each vector lane from block 102, the branch instruction takes each lane down one of the two possible instruction streams. In this particular non-limiting example, block 102 reveals that for three of the lanes A<10 is true (T) and for one of the lanes A<10 is false (F). Regardless of the results from block 102, the predicated vector instructions (3, 4, 5, 7, 8, 9) are dispatched to all vector lanes. This is one stage where the present techniques differ from the baseline process.

Specifically, with the baseline process, regardless of its mask value—the same instructions will be dispatched to all of the execution lanes to wait for issue. As provided above, this represents an inefficiency in the conventional process since (for instance in the example currently being used) one or more lanes will remain inactive in each cycle. By comparison, with the present techniques, different instructions can be executed at different lanes (during the same cycle). Namely, referring to the timing diagrams in FIG. 2, the ideal scenario (i.e., that achieved using the present techniques) is shown illustrated on the right. For comparison, the baseline process is shown illustrated on the left. Arrows are provided in the figure to indicate the progression timeline.

Figure 2:
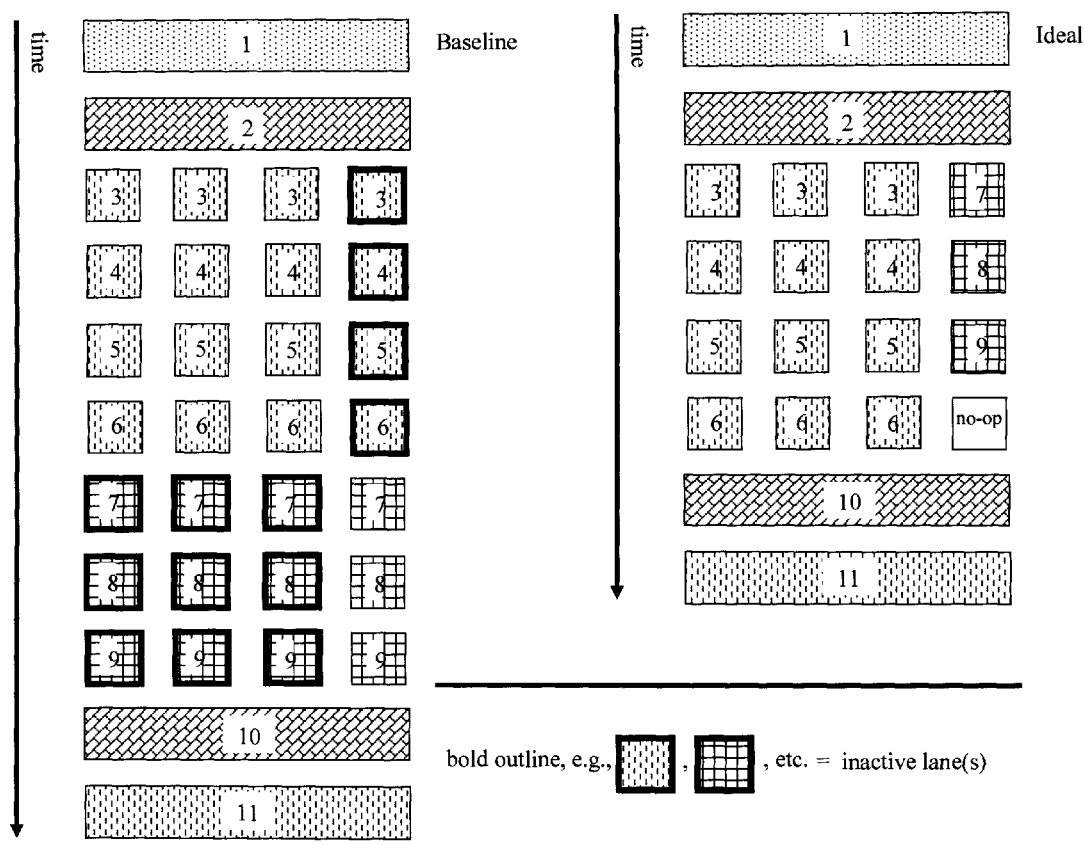
FIG. 2 is a timing diagram illustrating the exemplary code segment of FIG. 1 according to an embodiment of the present invention.

As shown in FIG. 2, with regard to the 'baseline' scenario and the 'ideal' scenario, the predicated vector instruction is fetched, decoded, and then dispatched. This is one stage at which the two scenarios differ. Namely, with conventional (baseline) scenarios, only one instruction can be executed per cycle across all lanes. Thus, in order to execute different instructions for different lanes, according to the baseline scenario—at each cycle an instruction is executed for the corresponding lanes while the other lanes (for which a different instruction is issued) remain inactive. The inactive lanes at each cycle are shown in bold. Thus, as shown in FIG. 2, in this example where different instructions are issued for three of the four lanes, the result is that in order to execute instructions 3, 4, 5, 6, one lane remains inactive for four cycles. Similarly, in order to execute instructions 7, 8, 9, for the remaining lane, three lanes remain inactive for three cycles. This is inefficient use of the processing resources.

By comparison, the present 'ideal' scenario exploits new vector processing architecture which enables different operations to be performed at different lanes during the same cycle, as long as they do not present any resource conflicts or violate any data dependency. As is known in the art, non-conflicting instructions are those instructions which can be issued and executed in parallel since they do not compete for a same shared resource. By comparison, conflicting instructions are those instructions which are dependent on the same shared resource, and thus cannot be executed in parallel.

By way of the present techniques, the number of inactive lanes can be significantly reduced or eliminated, increasing the amount and speed at which data can be processed. Thus, using the scenario illustrated in FIG. 2 (right side) as an example, the instruction 3 can be executed for three of the lanes, while in the same cycle the instruction 7 is executed on the fourth lane. The same situation applies for instructions 4/8, 5/9, etc. It is notable that with the present process, since the predicated vector instruction is only dispatched to the active lanes and the inactive lanes will either have a non-conflicting or a no operation (no-op) (see FIG. 2) scheduled at the same time, write back can be applied generally to all lanes.

Referring back now to FIG. 1, in blocks 106 and 108 instructions 3, 4, 5, and 6, respectively, are issued to one or more of the lanes for which A<10 is true (T), while in block 110, instructions 7, 8, 9 are issued to one or more other lanes of the lanes for which A<10 is false (F). Reference again to FIG. 2 illustrates that (as provided above) with the present techniques these instructions (for when A<10 is true (T) and A<10 is false (F)) can be performed in the same cycle thus greatly enhancing processor efficiency. By comparison, with conventional techniques, only one instruction is issued per cycle, thus in order to execute multiple instructions (as in the instant example) one or more lanes remain inactive in each cycle.

In block 112 of FIG. 1, the two divergent instruction streams converge and all vector lanes are active. Starting from block 112, instructions are applied to all vector lanes as shown in block 112 and 114.

Namely, since with conventional processes the predicated vector instructions—regardless of their mask value—are dispatched to all execution lanes, then following issue and execution, the data that is produced from the predicated vector instructions are written back to only the active lanes. By comparison, since with the present techniques the inactive lanes will have non-conflicting instructions (or no-op), then write back can be applied generally to all lanes. With the above overview, the present techniques are now described in detail.

As summarized above, with the emerging architecture where the restriction of the same operation across all vector lanes is relaxed, different vector lanes are allowed to execute different instruction at the same cycle. This gives opportunities to increase pipeline utilization and efficiency by scheduling other non-conflict instructions to the inactive lanes of predicated vector instructions.

This implementation calls for the dispatcher to dispatch the predicated instruction to only the active lanes to free up the issue slots in the inactive lanes for other non-conflict instructions. The status, active vs. inactive, of each lane of a predicated vector instruction is indicated by the vector mask register or VMR. However, the value of the vector mask register is not always known at the dispatch time of the predicated vector instruction.

The present new dispatch scheme of dispatching the predicated vector instructions to only the active lanes relies on knowing the vector mask register value at dispatch time (i.e., whether a mask value is available at dispatch time or using prediction if a mask value is not available). Namely, if the mask value is unknown, the dispatcher dispatches the instruction to all vector lanes and takes up unnecessary resources in the inactive lanes (see description of baseline scenario—above). Although there are techniques to remove the dispatched instructions in the inactive lanes before its issuing, all these solutions are complicated and add substantial overhead.

The present techniques center on the method in vector mask value predication to free up issuing slots in the inactive lanes for other non-conflict instructions to improve processor performance. When the prediction is incorrect, a flush is performed to maintain the machine correctness. In addition, a counter-based safeguard mechanism is preferably added to fall back to the baseline dispatch when the mask value predictor functions poorly, making too many (i.e., more than a pre-set number of) mis-predictions, during the run time. Similar to branch prediction, many techniques known in the art can be applied here to predict vector mask values of predicated vector instruction.

According to one non-limiting exemplary embodiment, same value prediction is used to predict vector mask values of predicated vector instruction. The concept of same value prediction is that the mask value does not generally change from one predicated vector instruction to the next, e.g., it typically remains either true or false. So in this scenario, an assumption is made, e.g., that the mask value remains the same over the course of a program phase—such a mask value is also referred to herein as a stale mask value.

More specifically, it is observed that the mask value is over-written with the same value repeatedly during the execution. Namely, the stale mask value is used as a predictor to speculatively dispatch predicated vector instruction to predicted mask lanes. If by chance the prediction made is incorrect, then the instructions are re-dispatched and re-executed (also referred to herein as roll-back) with the correct mask. While roll-back in the case of an incorrect prediction is a cost in terms of processor performance, in most situations, the benefits of using same value prediction in accordance with the present techniques greatly outweigh the prediction errors (which are relatively few). In this exemplary embodiment, mask/un-mask decisions are always made at dispatch time, thus simplifying dependency tracking and resolution (as compared, for example, with techniques that involve removing the dispatched instructions in the inactive lanes before issuing).

It is notable that, as provided above, same value prediction is only one possible process that can be implemented in accordance with the present techniques to predict vector mask values of predicated vector instruction. Other prediction techniques known in the field of branch prediction may be applied in the same manner described. By way of example only, other suitable prediction schemes known in the art for predicting the vector lane mask value include, but are not limited to, using a saturating counter (bimodal predictor) to predict mask or unmask lanes, using a history buffer to dynamically hash the mask value for each predicated instruction (i.e., assume that the same predicated vector instruction will have the same mask value over the course of a program), using a two-level adaptive predictor scheme where both the mask value and its duration will be predicted (i.e., predict how long mask value will be active—e.g., the mask value will remain the same for four consecutive predicated vector instructions), etc. These are merely some of the predication techniques for the branch prediction (predicting whether a branch is taken or not taken) known in the art that may be implemented in accordance with the present techniques.

By way of example only, bimodal branch prediction is described, e.g., in Application Publication Number WO2012064677A1 filed by Venkumahanti et al., entitled "Bimodal branch predictor encoded in a branch instruction" (hereinafter "Application Publication Number WO2012064677A1"), the entire contents of which are incorporated by reference herein. Application Publication Number WO2012064677A1 describes use of a two bit counter having states of strongly taken, weakly taken, weakly not taken, and strongly not taken, and which is incremented for each taken branch and decremented for each not taken branch. For instance, in accordance with the present techniques, the binominal saturating counters can be applied to predict lane mask value, wherein each vector lane has a two bit counter having states of strongly masked, weakly masked, weakly unmasked, strongly unmasked. The counter is incremented for each predication that the lane is active and is decremented for each predication that the lane is inactive.

Use of a history buffer in branch prediction in a processor is described, e.g., in Application Publication Number WO2006057685A1 filed by Nye et al., entitled "Methods and apparatus for branch prediction and processing of microprocessor instructions and the like," the entire contents of which are incorporated by reference herein. For instance, in accordance with the present techniques, a history buffer of the lane mask value is cached and is indexed by hashing the instruction address.

Two-level adaptive branch prediction is described, e.g., in Yeh et al., "Alternative Implementations of Two-Level Adaptive Branch Prediction," The 19$^{th}$ Annual International Symposium on Computer Architecture, pp. 124-134, May 19-21, 1992, the entire contents of which are incorporated by reference herein. For instance, in accordance with the present techniques, branch predication technique in lane mask value prediction can be applied using a two-level adaptive predictor. A two-level adaptive predictor remembers the history of the last n predications for each lane, i.e., mask or unmask, and uses one saturating counter for each of the possible history patterns. This approach can quickly learn to predict an arbitrary repetitive sequence and can be used when the lane mask value has a repetitive pattern.

Figure 3:
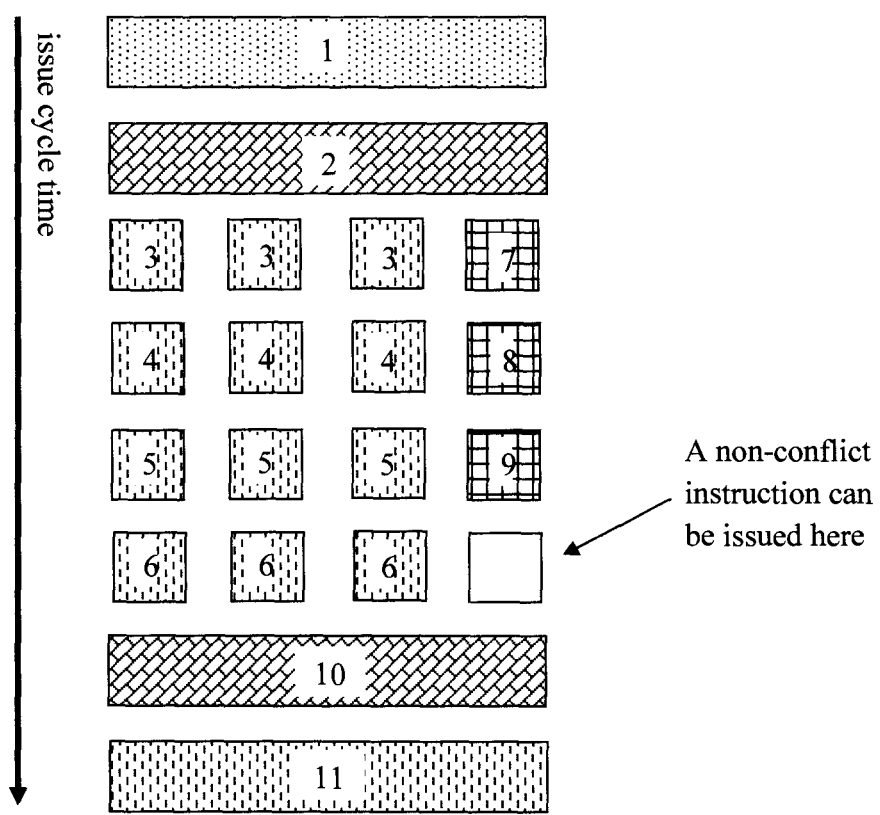
FIG. 3 is a timing diagram illustrating an exemplary scenario where the prediction of vector mask values of predicated vector instruction in accordance with the present techniques results in a perfect prediction, i.e., one where no prediction errors have occurred, according to an embodiment of the present invention.

When the vector mask values have been successfully predicted (using whatever suitable prediction technique, see above) the result may be that shown for instance in FIG. 3. FIG. 3 is a timing diagram illustrating an exemplary scenario where the prediction of vector mask values of predicated vector instruction in accordance with the present techniques results in a perfect prediction, i.e., one where no prediction errors have occurred. As described above, in most cases errors occur relatively infrequently. However, in the event of a prediction error, a roll-back process can be implemented to re-dispatch and re-execute the instruction with the correct mask value. See, for example, FIG. 4 (described below).

As shown in FIG. 3, the mask values for the lanes remain the same from one predicated instruction to the next. Thus, using the stale mask value for predicated vector instruction prediction would, in this case, result in a perfect prediction.

While prediction errors can occur and in most cases can be addressed using the roll-back process (see above), it is possible that consistently incorrect predictions can be made which can significantly impact processor performance. In that case, a safeguard is preferably implemented where the baseline (see above) process is the default.

For instance, according to an exemplary embodiment, in order to prevent performance degradation due to frequent incorrect prediction, a safeguard counter is added to set a maximum bound of failed predictions before reverting back to the baseline configuration. Namely, in the case of significant prediction error (i.e., above a tolerance value as tracked by the counter), it is better to go with the baseline scenario. Either software or hardware can set the value of this counter during the initial bring-up or during the processor run-time According to an exemplary embodiment, the safeguard counter is decremented each time the vector lane mask prediction is incorrect. Once the safeguard counter reaches zero, the pipeline reverts back to the baseline scheme where it dispatches the same predicated vector instruction to all lanes until the mask value is known. Thus, in this exemplary case, the counter is set at a maximum tolerance level (i.e., at the maximum number of prediction errors that will be tolerated either by the kernel or by the hardware) and counts down each time a prediction error occurs. The tolerance level depends heavily on the specific implementation of each processor design. For instance, one should take into account the performance improvement of correct prediction and the performance penalties of wrong prediction roll back. The performance effect may also be impacted by the type of workload being run on the machine. Therefore, for optimal performance, this counter value is preferably set dynamically and adaptively by both software and hardware. Given the teachings provided herein, implementation of a dynamic tolerance level in accordance with those teachings based on parameters such as performance, workload, etc. is within the capabilities of one skilled in the art.

Once the counter reaches zero and the maximum bound is reached, the system reverts back to the baseline process (e.g., assigning the same instruction to each lane). After a certain (e.g., preset) period of time, the present process using predicted vector mask values can again be instituted and the safeguard counter reset. Resetting the counter permits re-execution of the process for a different phase of the workload. Namely, as the behavior of a program typically changes during the course of its run, the prediction scheme might not work well for certain phases of the workload but can work well for others. So, by resetting the counter, the hope is that the scheme will work well for the next phase of the program.

Figure 4:
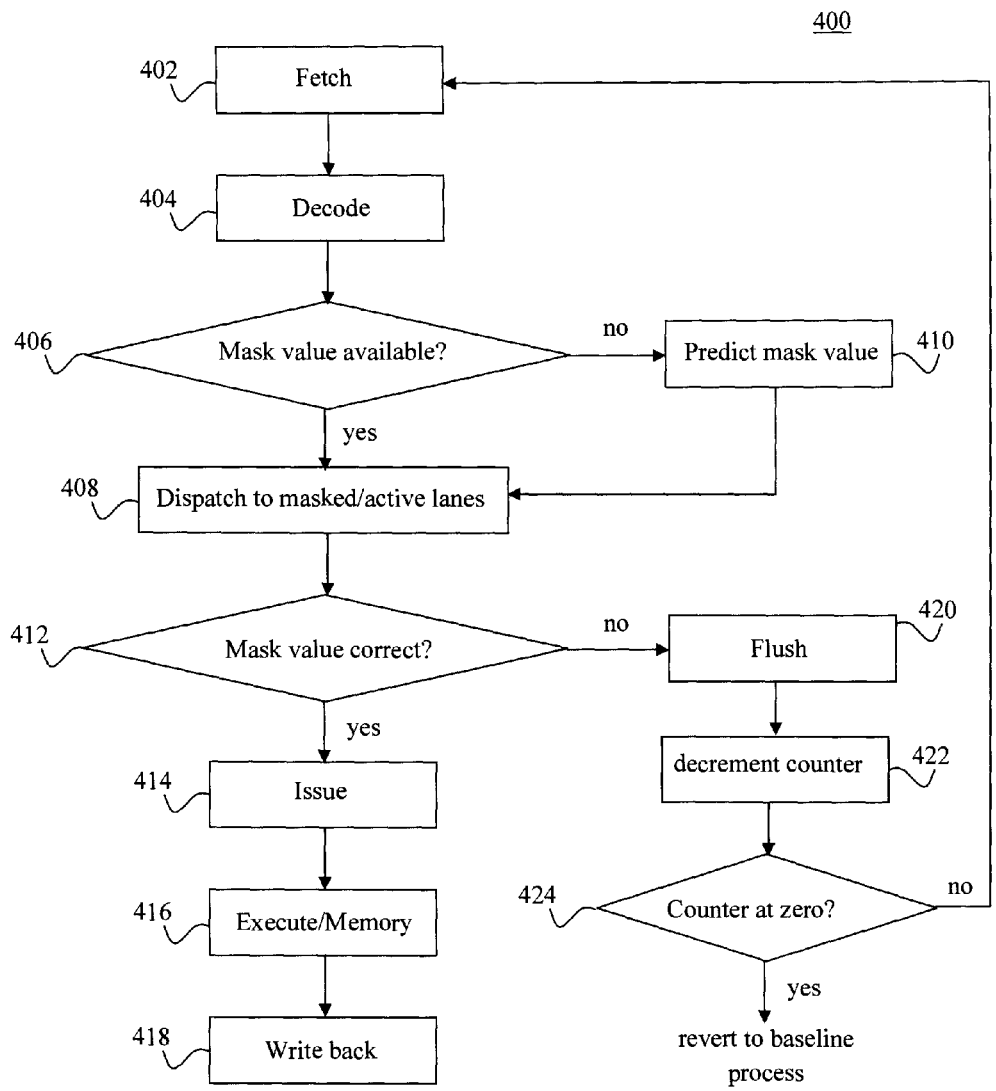
FIG. 4 is a diagram illustrating an exemplary methodology for vector lane predication prediction for vector processors according to an embodiment of the present invention.

FIG. 4 is a diagram illustrating exemplary methodology 400 for vector lane predication prediction for vector processors according to the present techniques. In step 402, the instructions are first fetched from the memory (fetch), and in step 404, the instructions are then decoded into fields for the machine to execute further (decode).

After the decode stage, in step 406, a determination is made as to whether the mask value of predicated vector instruction is available. If the mask value has already been produced from the execution of the earlier instruction, then as per step 408, the instructions will be dispatched to the masked/active lanes only.

On the other hand, if the mask value of the predicated vector instruction is not available due to the fact that the writer of the mask has not been executed, then as per step 410, the mask value of the predicated vector instructions is predicted, and the predicated vector instructions are then dispatched to the masked/active lanes as per step 408. Exemplary suitable techniques for predicting the mask value of predicated vector instruction were described in detail above.

The term "instructions" as used herein generally applies to any instructions fetched from the memory. More specifically, however, there are scalar and vector instructions. The scalar instructions operate on only a single data set while vector instructions operate on multiple data sets. Within the vector instructions, there are the traditional vector instructions (all lanes are active all of the time) and the present predicated vector instructions (active lanes are determined by a mask register). The mask register value (or simply "mask value") is generated by a previous instruction and is not encoded as part of the instruction. When, as per step 402, instructions are fetched from the memory, these instructions are fetched without knowing their type (i.e., scalar or vector). The decoding step 404 will reveal the type of instruction and the techniques described herein for vector lane predication prediction will be applied to (only) the predicated vector instructions. Thus, the same instructions (including the predicated vector instructions) are being pushed from fetch, decode, and through the rest of the pipeline stage. However the act of determining if the mask value is available before dispatch preferably applies only to the cases where the instructions are predicated instructions. Namely, since there is only a lane mask register for the predicated vector instructions, vector lane predication prediction as described herein is applied to only the predicated vector instructions. For a general description of how predicated vector instructions are traditionally processed see, for example, U.S. Pat. No. 8,356,162 issued to Muff et al., entitled "Execution Unit with Data Dependent Conditional Write Instructions," the entire contents of which are incorporated by reference herein.

As described above, before issuing the instruction, as a safeguard the processor will determine as per step 412 whether the predicted mask value is correct, i.e., the processor will check whether the predicted mask value is equal to the actual value produced (i.e., by the writer of the mask). If the prediction is correct, then as per step 414, the instruction will be issued to the functional units of the processor.

In vector processing, instructions (fetched, e.g., in step 402) can be executed multiple times with different data. Thus, in step 416, the arithmetic and logic instructions are executed with the functional units and load and store instructions are scheduled to access the data memory accordingly. Since the inactive lanes will have non-conflicting instructions (or no-op), then in step 418, the resulting data for all of the lanes that is produced from the predicated vector instruction is written back to a register file. The predicated vector instructions (the consumer of the mask value) perform computation to produce new data (generally referred to herein as "resulting data" or simply as "results"). During the write back, the results are written back to the register file. The mask value is updated from a previous instruction that is a writer to the mask. By comparison, as described above, with conventional processes the write back is generally applied only to the masked/active lanes.

On the other hand, if it is determined in step 412 that the mask value (predicted in step 410) is incorrect, a roll-back process can be implemented to re-dispatch and re-execute the instruction with the correct mask value. Namely, in step 420 the machine will flush/remove the predicated instruction that is predicted, and the process will resume at fetch (step 402—see FIG. 4). Namely, the roll-back process (due to an incorrect mask prediction) flushes out the instructions for re-fetching, i.e., it removes from the processor pipeline the instructions that are predicted incorrectly.

As provided above, an optional safeguard counter may be implemented which as per step 422 can be decremented every time such an error occurs. In step 424, a determination is made as to whether the maximum number of errors has been reached. If the maximum number of errors has not been reached, then the process will resume at fetch (step 402). On the other hand, once the counter reaches zero and the maximum bound is reached, the system reverts back to the baseline process (see above). As described above, after a certain (e.g., preset) period of time, methodology 400 using predicted vector mask values can again be instituted and the safeguard counter reset.

Figure 5:
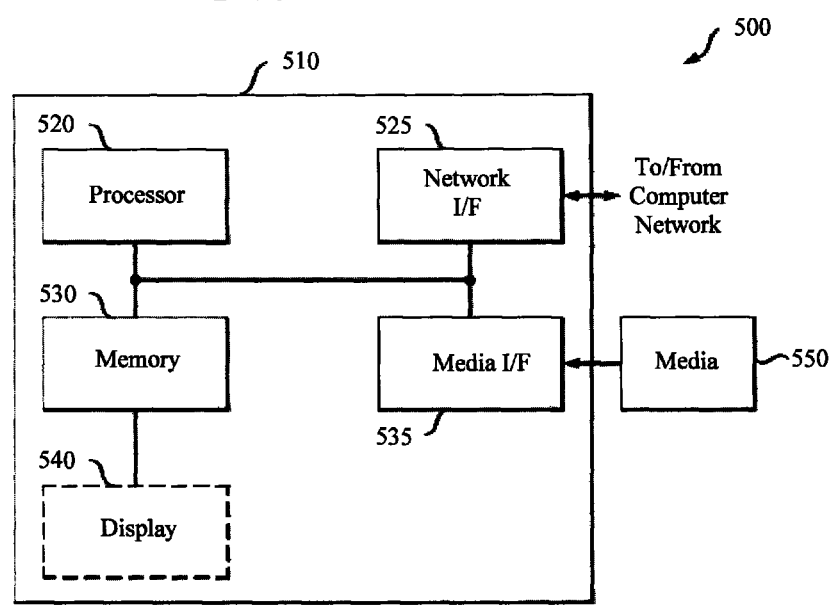
FIG. 5 is a diagram illustrating an exemplary apparatus for performing one or more of the methodologies presented herein according to an embodiment of the present invention.

Turning now to FIG. 5, a block diagram is shown of an apparatus 500 for implementing one or more of the methodologies presented herein. By way of example only, apparatus 500 can be configured to implement one or more of the steps of methodology 400 of FIG. 4 for vector lane predication prediction for vector processors.

Apparatus 500 includes a computer system 510 and removable media 550. Computer system 510 includes a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

As is known in the art, the methods and apparatus discussed herein may be distributed as an article of manufacture that itself comprises a machine-readable medium containing one or more programs which when executed implement embodiments of the present invention. For instance, when apparatus 500 is configured to implement one or more of the steps of methodology 400 the machine-readable medium may contain a program configured to fetch predicated vector instructions from a memory; decode the predicated vector instructions; determine if a mask value of the predicated vector instructions is available and, if the mask value of the predicated vector instructions is not available, predicting the mask value of the predicated vector instructions; if the mask value of the predicated vector instructions is predicted, determine whether the mask value of the predicated vector instructions that is predicted is correct (prior to issuing the instructions) and, if the mask value of the predicated vector instructions that is predicted is incorrect, removing the predicated vector instructions for which the mask value that is predicted is incorrect, and resuming the method at the fetching step; dispatch the predicated vector instructions to only masked vector lanes; issue the predicated vector instructions to functional units of the processor; execute the predicated vector instructions with the functional units of the processor; and write back data resulting from executing the predicated vector instructions for all vector lanes to a register file.

The machine-readable medium may be a recordable medium (e.g., floppy disks, hard drive, optical disks such as removable media 550, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of vector lane predication for a processor, comprising the steps of:
    fetching predicated vector instructions from a memory;
    decoding the predicated vector instructions;
    determining if a mask value of the predicated vector instructions is available and, if the mask value of the predicated vector instructions is not available, predicting the mask value of the predicated vector instructions;
    dispatching the predicated vector instructions to only masked vector lanes; and
    dispatching non-conflicting instructions to only unmasked vector lanes at a same time as the predicated vector instructions are dispatched to the masked vector lanes, wherein
        the mask value of the predicated vector instructions is predicted, the method further comprising determining whether the mask value of the predicated vector instructions that is predicted is correct and, if the mask value of the predicated vector instructions that is predicted is incorrect, removing the predicated vector instructions for which the mask value that is predicted is incorrect, and resuming the method at the fetching step;
    decrementing a safeguard counter each time it is determined that the mask value of the predicated vector instructions that is predicted is incorrect, wherein the safeguard counter is set at a dynamic maximum tolerance level that includes a maximum bound of incorrect predictions that will be tolerated by taking into account a performance improvement of the processor device by the correct prediction of the mask value and also taking into account a performance penalty of the processor device by the incorrect prediction of the mask value; and
    reverting to a baseline process when the safeguard counter reaches zero which dispatches a same predicated vector instruction to all lanes until the mask value is known.

2. The method of claim 1, further comprising the steps of:
    issuing the predicated vector instructions to functional units of the processor;
    executing the predicated vector instructions with the functional units of the processor; and
    writing back data resulting from executing the predicated vector instructions for all vector lanes including the masked and unmasked vector lanes to a register file.

3. The method of claim 2, wherein the
    determining whether the mask value of the predicated vector instructions that is predicted is correct is prior to issuing the predicated vector instructions.

4. The method of claim 3, further comprising the step of:
    checking whether the mask value of the predicated vector instructions that is predicted is equal to an actual produced value.

5. The method of claim 1, further comprising the step of:
    after a preset period of time, resuming the method at the fetching step, and resetting the safeguard counter to permit re-execution of the method for a different phase of a workload that occurs by changes in a behavior of the workload during execution of the method.

6. A method of vector lane predication for a processor, comprising the steps of:
    fetching predicated vector instructions from a memory;

decoding the predicated vector instructions;
determining if a mask value of the predicated vector instructions is available and, if the mask value of the predicated vector instructions is not available, predicting the mask value of the predicated vector instructions;
dispatching the predicated vector instructions to only masked vector lanes;
dispatching non-conflicting instructions to only unmasked vector lanes at a same time as the predicated vector instructions are dispatched to the masked vector lanes;
issuing the predicated vector instructions to functional units of the processor;
executing the predicated vector instructions with the functional units of the processor;
writing back data resulting from executing the predicated vector instructions for all vector lanes including the masked and unmasked vector lanes to a register file, wherein
the mask value of the predicated vector instructions is predicted, the method further comprising the step of determining whether the mask value of the predicated vector instructions that is predicted is correct and, if the mask value of the predicated vector instructions that is predicted is incorrect, removing the predicated vector instructions for which the mask value that is predicted is incorrect, and resuming the method at the fetching step;
decrementing a safeguard counter each time it is determined that the mask value of the predicated vector instructions that is predicted is incorrect, wherein the safeguard counter is set at a dynamic maximum tolerance level that includes a maximum bound of incorrect predictions that will be tolerated by taking into account a performance improvement of the processor device by the correct prediction of the mask value and also taking into account a performance penalty of the processor device by the incorrect prediction of the mask value; and
reverting to a baseline process when the safeguard counter reaches zero which dispatches a same predicated vector instruction to all lanes until the mask value is known.

7. The method of claim 6, further comprising the step of:
after a preset period of time, resuming the method at the fetching step, and resetting the safeguard counter.

8. An apparatus for vector lane predication, the apparatus comprising:
a memory; and
at least one processor device, coupled to the memory, operative to:
fetch predicated vector instructions from the memory;
decode the predicated vector instructions;
determine if a mask value of the predicated vector instructions is available and, if the mask value of the predicated vector instructions is not available, predicting the mask value of the predicated vector instructions;
dispatch the predicated vector instructions to only masked vector lanes; and
dispatch non-conflicting instructions to only unmasked vector lanes at a same time as the predicated vector instructions are dispatched to the masked vector lanes, wherein
the mask value of the predicated vector instructions is predicted, the at least one processor device is further operative to determine whether the mask value of the predicated vector instructions that is predicted is correct and, if the mask value of the predicated vector instructions that is predicted is incorrect, removing the predicated vector instructions for which the mask value that is predicted is incorrect, resume the fetch predicated vector instructions from the memory;
decrement a safeguard counter each time it is determined that the mask value of the predicated vector instructions that is predicted is incorrect, wherein the safeguard counter is set at a dynamic maximum tolerance level that includes a maximum bound of incorrect predictions that will be tolerated by taking into account a performance improvement of the processor device by the correct prediction of the mask value and also taking into account a performance penalty of the processor device by the incorrect prediction of the mask value; and
revert to a baseline process when the safeguard counter reaches zero which dispatches a same predicated vector instruction to all lanes until the mask value is known.

9. The apparatus of claim 8, wherein the at least one processor device is further operative to:
issue the predicated vector instructions to functional units of the processor;
execute the predicated vector instructions with the functional units of the processor; and
write back data resulting from executing the predicated vector instructions for all vector lanes including the masked and unmasked vector lanes to a register file.

10. The apparatus of claim 9, wherein the at least one processor device is further operative to:
determine whether the mask value of the predicated vector instructions that is predicted is correct prior to issuing the predicated vector instructions.

11. The apparatus of claim 8, wherein the at least one processor device is further operative to:
after a preset period of time, resume the fetch the predicated vector instructions from the memory and reset the safeguard counter.

12. A non-transitory article of manufacture for vector lane predication for a processor, comprising a machine-readable recordable medium containing one or more programs which when executed implement the steps of:
fetching predicated vector instructions from a memory;
decoding the predicated vector instructions;
determining if a mask value of the instructions is available and, if the mask value of the predicated vector instructions is not available, predicting the mask value of the predicated vector instructions;
dispatching the predicated vector instructions to only masked vector lanes;
dispatching non-conflicting instructions to only unmasked vector lanes at a same time as the predicated vector instructions are dispatched to the masked vector lanes;
decrementing a safeguard counter each time it is determined that the mask value of the predicated vector instructions that is predicted is incorrect, wherein the safeguard counter is set at a dynamic maximum tolerance level that includes a maximum bound of incorrect predictions that will be tolerated by taking into account a performance improvement of the processor device by the correct prediction of the mask value and also taking into account a performance penalty of the processor device by the incorrect prediction of the mask value;

reverting to a baseline process when the safeguard counter reaches zero which dispatches a same predicated vector instruction to all lanes until the mask value is known; and resetting the safeguard counter after a preset period of time to permit re-execution of the method for a different phase of a workload.

\* \* \* \* \*